US009026610B2

(12) United States Patent
Lemoine et al.

(10) Patent No.: US 9,026,610 B2
(45) Date of Patent: May 5, 2015

(54) METHOD OF COLLECTING REAL TIME DATA

(75) Inventors: Benoit Lemoine, Ploubezre (FR); Houmed Ibrahim, Lannion (FR); Yannick Le Louedec, Plerin (FR)

(73) Assignee: France Telecom, Paris (FR)

( * ) Notice: Subject to any disclaimer, the term of this patent is extended or adjusted under 35 U.S.C. 154(b) by 392 days.

(21) Appl. No.: 13/201,177

(22) PCT Filed: Jan. 25, 2010

(86) PCT No.: PCT/FR2010/050105
§ 371 (c)(1),
(2), (4) Date: Nov. 15, 2011

(87) PCT Pub. No.: WO2010/092272
PCT Pub. Date: Aug. 19, 2010

(65) Prior Publication Data
US 2012/0054317 A1     Mar. 1, 2012

(30) Foreign Application Priority Data

Feb. 12, 2009   (FR) ...................................... 09 50877

(51) Int. Cl.
*G06F 15/16*     (2006.01)
*H04L 12/18*     (2006.01)
(Continued)

(52) U.S. Cl.
CPC ................ *H04L 12/18* (2013.01); *H04L 12/24* (2013.01); *H04L 41/00* (2013.01); *H04L 41/0893* (2013.01); *H04L 65/4076* (2013.01); *H04L 65/608* (2013.01)

(58) Field of Classification Search
CPC .............. H04L 65/608; H04L 43/0864; H04L 12/1868; H04L 12/1872; H04L 43/087; H04B 3/231; H04M 3/002; H04N 21/6377

USPC .................. 709/204–207, 212–232, 248–249
See application file for complete search history.

(56) References Cited

U.S. PATENT DOCUMENTS 7,362,707 B2 *  4/2008  MeLampy et al. ............ 370/235
2003/0072269 A1 *  4/2003  Teruhi et al. .................. 370/252
(Continued)

OTHER PUBLICATIONS

Schulzrinne et al. (Schulzrinne, RTP: A Transport Protocol for Real-Time Applications, Jul. 2003, Network Working Group Request for Comments: 3550, p. 1-98).*

(Continued)

*Primary Examiner* — Brian J Gillis
*Assistant Examiner* — Michael A Keller
(74) *Attorney, Agent, or Firm* — David D. Brush; Westman, Champlin & Koehler, P.A.

(57) ABSTRACT

Methods are provided for communication in a broadcast group and for collecting real time data in a broadcast group. The broadcast group includes a set of sources that send real time data, the set being made up of at least two sources and a server. A data-sending source of the group sends first time information relating to a first exchange of control data of the first source with the server by broadcasting to the members of the group. The first exchange is the one and only exchange of control data of the first source with the members of the broadcast group. The data-sending source receives second time information sent by the server and relating to the first exchange of control data between the first source and the server and to a second exchange of control data between the second source and the server. The source also receives second time data from other sources of the group and determines a transmission time between itself and another source of the group from the first and second received time information.

12 Claims, 3 Drawing Sheets

(51) Int. Cl.
*H04L 12/24* (2006.01)
*H04L 29/06* (2006.01)

(56) References Cited

U.S. PATENT DOCUMENTS

| | | | | |
|---|---|---|---|---|
| 2003/0147386 A1* | 8/2003 | Zhang et al. | | 370/390 |
| 2004/0066775 A1* | 4/2004 | Grovenburg | | 370/350 |
| 2006/0018266 A1* | 1/2006 | Seo | | 370/252 |
| 2007/0133432 A1* | 6/2007 | De Noia et al. | | 370/253 |
| 2007/0153827 A1* | 7/2007 | Lee | | 370/466 |
| 2008/0049635 A1* | 2/2008 | Huang et al. | | 370/252 |
| 2008/0080702 A1* | 4/2008 | Zhang et al. | | 379/406.08 |
| 2009/0135735 A1* | 5/2009 | Zhang et al. | | 370/253 |
| 2009/0276678 A1* | 11/2009 | Ihara | | 714/751 |
| 2010/0023635 A1* | 1/2010 | Labonte et al. | | 709/231 |
| 2011/0191469 A1* | 8/2011 | Oran | | 709/224 |
| 2012/0069135 A1* | 3/2012 | Cipolli et al. | | 348/14.08 |
| 2012/0259624 A1* | 10/2012 | Anandakumar et al. | | 704/219 |

OTHER PUBLICATIONS

Liu, Jiangchuan et al., "Distributed distance measurement for large-scale networks," Department of Computer Science, The Hong Kong University of Science and Technology, 16 pages, Sep. 2002.

International Search Report dated Mar. 26, 2010 for corresponding International Application No. PCT/FR2010/050105, filed Jan. 25, 2010.

English Translation of the Written Opinion dated Mar. 26, 2010 for corresponding International Application No. PCT/FR2010/050105, filed Jan. 25, 2010.

English Translation of the International Preliminary Report on Patentability dated Oct. 4, 2011 for corresponding International Application No. PCT/FR2010/050105, filed Jan. 25, 2010.

* cited by examiner

METHOD OF COLLECTING REAL TIME DATA

CROSS-REFERENCE TO RELATED APPLICATIONS

This application is a Section 371 National Stage Application of International Application No. PCT/FR2010/050105, filed Jan. 25, 2010 and published as WO WO2010/092272 on Aug. 19, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique of collecting real time data broadcast in a broadcast group.

The disclosure lies in the fields of telecommunications and more particularly of packet-switched communications networks. In networks of this type, it is possible to convey data streams that are associated with real time services.

BACKGROUND OF THE DISCLOSURE

Internet protocol (IP) as developed by the Internet engineering task force (IETF) is implemented on packet-switched networks both for supporting non-real time services such as data transfer services, consulting web pages, or electronic messaging, and for supporting real time or conversational services, such as telephony over IP, video telephony over IP, or indeed video broadcasting over IP.

One method of transporting data streams that present real time constraints is provided by the IETF in Standard RFC 3550. Real time data streams are generally made up of Real Time Protocol (RTP) packets, where an RTP packet comprises digital data derived from analog to digital conversion of signals picked up by sensors or from digital processing of the result of analog-to-digital conversion of signals coming from those sensors. Real time data may also correspond to digital data derived from signals collected by a set of distributed sensors, e.g. when observing road traffic.

A Real Time Control Protocol (RTCP) data stream is associated with a real time data stream. The control data serves in particular to enable equipment that receives a real time data stream to notify one or more pieces of equipment sending the data streams about the quality of the received signal. For this purpose, a distinction is made in RTCP data between Sender Report (SR) control data sent by receiver equipment that also sends an RTP data stream, and Receiver Report (RR) control data sent by receiver-only equipment or by receiver equipment that send a real time data stream, when the number of sender pieces of equipment in a given communication exceeds thirty-one.

According to the Standard RFC 3550, the RTCP control data contains various fields. These RTCP control data fields serve in particular to enable first equipment to notify second equipment sending RTP packets:

of the send instant of the Network Time Protocol (NTP) control data;
of a number of RTP packets received;
of a ratio of RTP packets lost;
of an inter-arrival jitter;
of a first time information field referred to as the Last Sender Report (LSR) field, corresponding to the instant at which the second equipment sends the last RTCP SR data to be received by the first equipment; and
of a second time information field referred to as delay since last sender report (DLSR), corresponding to the time that has elapsed between receiving said most recent RTCP SR packet of control data as sent by the second equipment and the instant at which said RTCP control data is sent.

These two time information fields enable equipment sending RTCP SR control data to calculate a round trip time for exchanging data with other equipment sending RTCP SR control data. For example, if $SSRC\_r$ is receiver equipment that transmits control data relating to sender equipment $SSRC\_n$, the control data including the two time information fields LSR and DLSR, the sender equipment $SSRC\_n$ can determine the round trip time rtt between itself and the receiver equipment $SSRC\_r$ on the basis of the two fields LSR and DLSR and on the basis of the instant A at which it receives the RTCP SR control data, where:

$$rtt = A - LSR - DLSR$$

Below, consideration is given to the situation in which a plurality of data sources send respective real time data streams made up of RTP packets in broadcast mode or multicast mode. A first source of the plurality sends real time data and the other sources receive the stream of data. A plurality of RTCP control data streams need to be established, where such a stream is exchanged between the first source and each of the other sources. For each of the other sources, the first source may determine a transmission time and each may use the determined transmission times in order to aggregate the real time data streams from other sources with its own real time data stream. The number of RTCP control data streams increases as a function of the number of RTP real time data sources. For any one broadcast source of real time data in a large-sized multicast broadcast group, managing the RTCP control data streams becomes extremely complex and consumes large amounts of processor and memory resources.

SUMMARY

In a first aspect, an embodiment of the invention provides a method of communication in a broadcast group, said group comprising a set of sources that send real time data, the set being made up of at least two sources and a server. The method comprises the following steps implemented by a first source of the group:

sending first time information relating to a first exchange of control data of the first source with the server by broadcasting to the members of the group, said first exchange being the one and only exchange of control data of the first source with the members of the broadcast group; and receiving second time information sent by the server and relating to the first exchange of control data between the first source and the server and to a second exchange of control data between a second source and the server.

By way of example, the real time data is broadcast using the RTP protocol and the control data is exchanged using the RTCP protocol. By means of the method of communication, a source of the group maintains one and only one exchange of control data between itself and one other member of the group. This exchange of control data takes place in particular with the server. Nevertheless, the exchange of data with the server is performed in broadcast mode or multicast mode. This enables the other members of the group to receive a copy of the control data transmitted by the source to the server. Thus, exchanges of control data between the source and the other sources of the group are not needed. Furthermore, all of the members of the group receive in addition to the control data associated with their own exchange of data with the server, the control data sent by the server to the other members of the group. This particular organization of exchanges of control data serves to economize on processor and memory resources in the sources of the group since they do not need to manage a plurality of exchanges of control data. Furthermore, when such a source joins the broadcast group, an existing source does not need to establish a new exchange of control data with the new source. Only the server needs to establish an exchange of control data with the new source.

In a second aspect, an embodiment of the invention also provides a method of collecting real time data broadcast in a broadcast group, said group comprising a set of sources that send real time data, the set being made up of at least two sources and a server. The method comprises the following steps implemented by a first source of the group:

receiving first time information sent by a second source of the group and relating to a first exchange of control data of said second source of the group with the server;

receiving second time information sent by the server and relating to a second exchange of control data between the first source and the server and to the first exchange of control data between the second source and the server; and determining a transmission time between the first and second sources on the basis of the first and second received time information.

A source of the group receiving the control data exchanged between another source of the group and the server can use said control data and its own control data to determine a transmission time between itself and the other source of the group. The change of architecture provided by an embodiment of the invention in a multicast broadcast group thus makes it possible to obtain the same information as in a non-centralized architecture, while economizing memory and processor resources at the sources, as described above.

Numerous distributed professional or scientific applications for collecting information require information coming from different sources to be aggregated while complying with several real time constraints. Implementation of such applications often remains confined in a small and determined space, in order to limit unforeseeable disturbances and in order to characterize expected disturbances finely so as to apply effective correction to such disturbances. When it is desired to extend the offer of these applications to non-restricted spaces, it then becomes necessary for the sources to be synchronized. A first solution is to introduce synchronous communications links between the sources in order to characterize the communications delays finely so that they can be taken into account when aggregating the information. A second solution consists in using sources including clocks that are extremely stable. The costs involved with those two solutions are not compatible with consumer applications. An embodiment of the invention thus proposes a solution that is simple to implement and that does not require the expensive addition of equipment or links.

In addition, in order to determine the transmission time, respective reception instants of the first and second time information are also taken into account.

The first and second time information may belong to the group comprising a send instant of the control data and an elapsed time at a source between receiving the control data from the server and said send instant.

The time information used for determining the transmission time is thus the information fields provided in the RTCP protocol. Implementing an embodiment of the invention is thus compatible with the existing version of the protocol.

In addition, the real time data collection method may include:

a step of receiving from the server an aggregate of real time data sent by the set of sending sources;

a step of determining real time data corresponding to a difference between the real time information collected by the first source, the received aggregate, and the real time data received from the other sending sources, the send instants of the received data being determined from the respective transmission times; and a step of sending the real time data in multicast mode.

By means of the respective transmission times determined for the various members of the group, the real time information collected by the source and the real time data received from the collection server or from the other sources is processed as a function of the time offset between the instant at which the real time data was sent by the member of the group in question and the instant at which it was received at the source. The difference between the real time information collected by the source and the real time data received thereby enable a source to generate real time data that does not present information redundancy with the other real time data. Only the real time data as generated in this way and that is therefore useful is transmitted over the network. Since the sources have a return of information in real time available to them, they can verify that the real time data they are sending is pertinent relative to this information return.

The server forming a member of the broadcast group and receiving real time data from the various sources is thus in a position to aggregate the real time data coming from the various sources and to relay it to the group as a return of information. The aggregate generated by the server may restrict the sources that are taken into account to those for which the respective transmission times are less than a predetermined threshold. The server is thus in a position to provide return of information more quickly because it aggregates without waiting for real time data for which the respective routing times through the communications network are long. Furthermore, the time needed for generating the return of information is also shortened because it is determined from only a restricted number of information sources.

Furthermore, the real time data collection method may also include a step of aggregating received real time data, the send instants of the received data being determined from the respective transmission times.

All of the real time data is also aggregated by taking account of a time offset between the instant at which the real time data was sent by the member of the group under consideration and the instant at which it was received at the source in order to enable it to be consulted locally at the source.

In a third aspect, an embodiment of the invention also provides a device for collecting real time data from a source sending real time data broadcast in a broadcast group, said group comprising a set of sources that send real time data, the set being made up of at least two sources and a server. The device comprises:

means for receiving first time information sent by another source of the group relating to a first exchange of control data of said other source of the group with the server;

means for receiving second time information sent by the server and relating to a second exchange of control data between the source and the server and to the first exchange of control data between the other source and the server; and means for determining a transmission time between the source and the other source from the first and second received time information.

In a fourth aspect, an embodiment of the invention also provides a collection system for collecting real time data broadcast in a broadcast group, said group comprising a set of sources that send real time data, the set being made up of at least two sources and a server, the server including a device for collecting real time data as described above, and the server including:

means for receiving first time information sent by a source of the group relating to an exchange of control data of said source of the group with the server; and means for sending second time information relating to exchanges of control data between the sources and the server by broadcasting to the members of the group.

In such a system, the server may further include means for aggregating real time data sent by the sources as a function of a time offset between an instant at which real time data was collected and an instant at which said data was received at the server.

In a fifth aspect, an embodiment of the invention also provides a computer program including instructions for implementing the method of collecting real time data as described above in a device for collecting real time data when the program is executed on a processor.

BRIEF DESCRIPTION OF THE DRAWINGS

The disclosure can be better understood with the help of the following description of a particular implementation of the method of an embodiment of the invention, given with reference to the accompanying drawings, in which.

DETAILED DESCRIPTION OF ILLUSTRATIVE EMBODIMENTS

Figure 1:
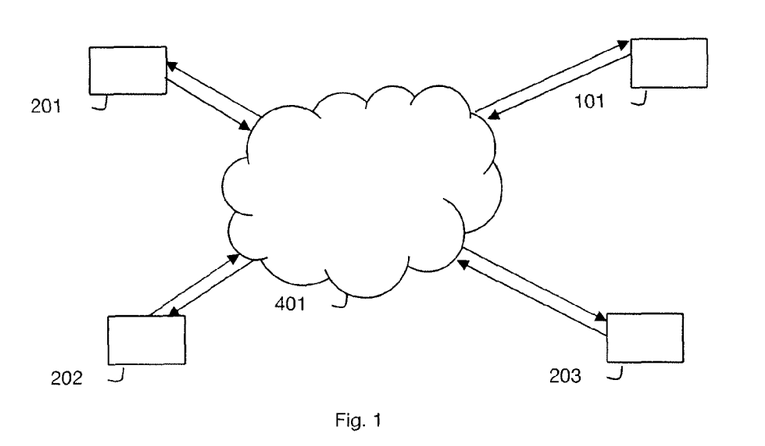
FIG. 1 shows a collection system in a particular embodiment of the invention.

FIG. 1 shows a system for collecting real time data in its environment. The system comprises a collection server 101, two collection clients 201 and 202, and a consultation client 203. The collection server 101 and the two collection clients 201 and 202 form part of a common broadcast group. For reasons of simplification, only two collection clients and one consultation client are shown. It should be observed that the collection system is not limited to these elements only.

A packet communications network 401 serves to convey packets between the various elements of the system for collecting real time data. In particular, it includes functions for broadcast or multicast mode transport. The network 401 may be an IP type network.

The collection clients 201 and 202 are arranged to collect real time information. The real time information may be associated with various services, such as transporting voice over an IP type network, a service for transporting video over IP, a road traffic observation service, or any other distributed real time information collection service.

The collection clients 201 and 202 are also arranged to broadcast real time data in the broadcast group. Thus, the clients 201 and 202 are also sources that send real time data. Consequently, the terms "collection client" and "real time data sender source" are used interchangeably. For example, the real time data may be broadcast in RTP packets, in compliance with RFC 3550. By way of example, the RTP packets broadcast by the collection client 201 are received by the collection server 101 and by the collection client 202. By way of example, RTP packets are broadcast once every ten milliseconds.

Control data exchanges are implemented within the broadcast group for each collection client of the broadcast group and the collection server 101. Thus, control data is exchanged between the collection client 201 and the collection server 101 and also between the collection client 202 and the collection server 101. By way of example, the control data is exchanged using the RTCP protocol, in accordance with RFC 3550. The data is exchanged at a frequency lower than the frequency at which RTP packets are exchanged, e.g. of the order of once per second.

A collection client 201 thus maintains only one exchange of data with the members of the group, and in particular with the collection server 101. In a prior art architecture, the collection client 201 needs to maintain data exchanges with all of the other collection clients. If a new collection client joins the broadcast group, then the collection client 201 must also set up a new data exchange for the new collection client. In an embodiment of the invention, a single exchange of data is established between the collection client 201 and the collection server 101. As a result, processor and memory resources of the collection client are economized.

In an embodiment of the invention, provision is made for the control data to be sent in multicast mode, i.e. encapsulated in the multicast IP packet. Thus, the collection client 201 receives control data transmitted by the collection client 202 to the collection server 101. Encapsulation of multicast IP packets is provided for in RFC 3550. Unlike unicast IP packets, which are conveyed to a single destination identified by the destination IP address, multicast IP packets are conveyed in the network 401 and replicated as close as possible to Internet group management protocol (IGMP) destination clients, e.g. as defined in version 2 of RFC 2236, where the IGMP clients have requested the IP network 401 to receive the IP packets sent to a given multicast IP address. This multicast IP address characterizes the broadcast group.

RTP and RTCP packets may equally well be transported in IPv4 and IPv6 packets.

To this end, and in accordance with RFC 768, the RTP packets may previously be encapsulated in user datagram protocol (UDP) packets, and the RTCP packets are previously encapsulated in UDP packets.

According to RFC 3550, a sender report packet RTCP SR sent from first equipment to second equipment includes in particular the following information fields:

a network time protocol (NTP) control data send instant;
a number of received RTP packets;
a ratio of lost RTP packets;

an inter-arrival jitter;

a first time information field referred to as the Last Sender Report (LSR) field, corresponding to the instant at which the last RTCP SR control data was sent by the second equipment and received by the first equipment, i.e. a copy of the NTP field of the most recently received control data; and a second time information field referred to as a Delay since Last Sender Report (DLSR) field, corresponding to the time that elapses between receiving said last RTCP SR packet control data as sent by the second equipment and the instant at which said RTCP control data was sent.

The collection server 101 thus transmits RTCP SR control data 501 in multicast mode that includes for the collection client 201 time information that is written as follows:

NTP1101 for the instant at which the control data was sent; and

LSR201 for the first time information field and DLSR201 for the second time information field.

The collection server 101 also transmits RTCP SR control data 502 in multicast mode that includes for the collection client 202, time information that is written as follows:

NTP2101 for the instant at which the control data was sent; and

LSR202 for the first time information field and DLSR202 for the second time information field.

The collection client 201 transmits RTCP SR control data 601 to the collection server 101 in multicast mode, said data including time information that is written as follows: NTP201 for the instant at which the control data was sent, LSR1101 for the first time information field; and DLSR1101 for the second time information field.

The collection client 202 thus transmits RTCP SR control data 602 to the collection server 101 in multicast mode, which data includes time information written below as follows: NTP202 for the instant at which the control data was sent; LSR2101 for the first time information field, and DLSR2101 for the second time information field.

This control data thus enables the collection client 201 to obtain time information relating to the exchange of control data between the collection server 101 and the collection client 202, without it being necessary for it itself to set up an exchange of control data with the collection client 202.

These various exchanges of control data are described in greater detail below with reference to FIG. 2.

Figure 2:
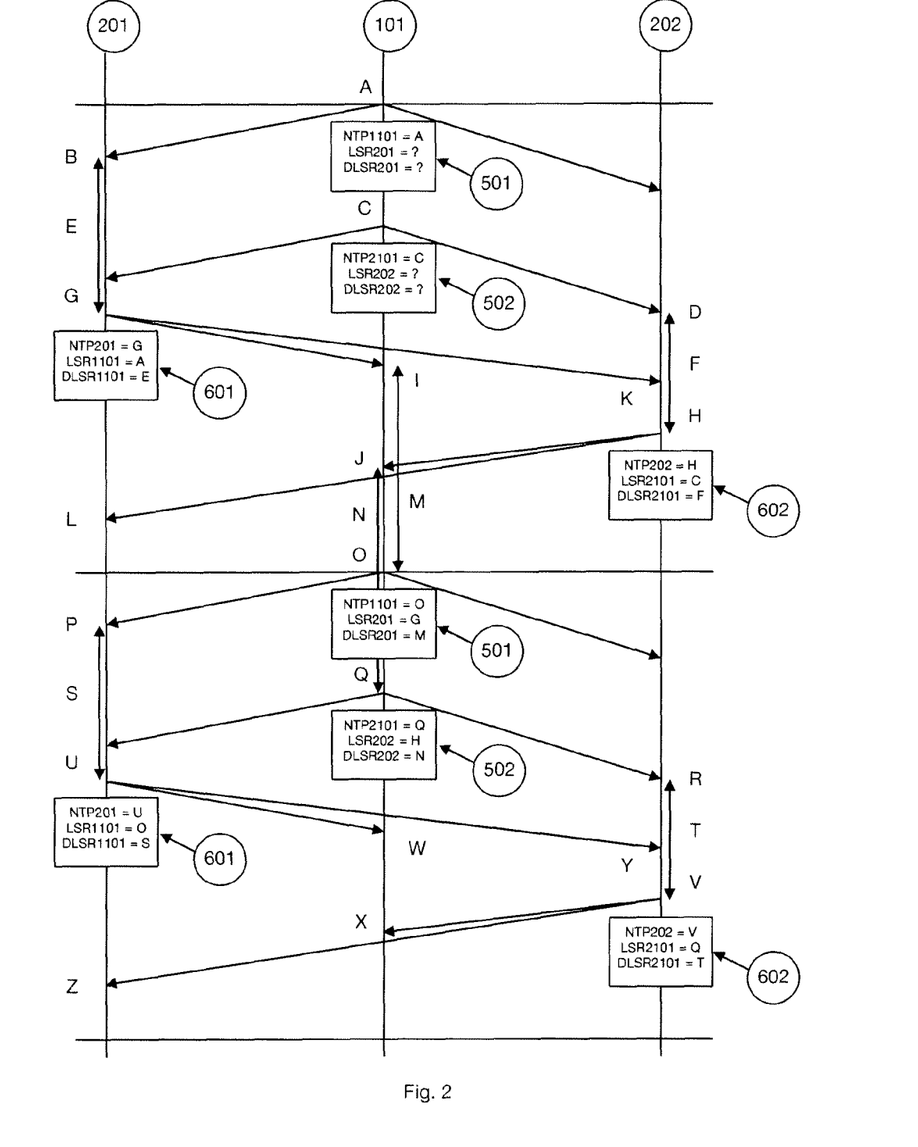
FIG. 2 is a diagram illustrating a particular implementation of the method of an embodiment of the invention.

At an instant marked A in FIG. 2, the collection server 101 sends a first RTCP SR packet 501 in multicast mode relating to an exchange of control data between itself and the collection client 201, the packet including the value A in the field NTP1101, a first field LSR201, and a second field DLSR201. This first RTCP SR packet 501 is received in particular by the collection client 202 at instant B.

At the instant marked C in FIG. 2, the collection server 101 sends a first RTCP SR packet 502 in multicast mode relating to an exchange of control data between itself and the collection client 202, and including the value C in the field NTP2101, a first field LSR202, and a second field DLSR202. This first RTCP SR packet 502 is received in particular by the collection client 202 at instant D.

At instant G, the collection client 201 sends a first RTCP SR packet 601 in multicast mode including the value G in the field NTP201, the value A in the field LSR1101, and the value E in the field DLSR1101, where the value E is equal to the difference between G and B. This first RTCP SR packet 601 is received at instant I by the collection server 101 and at instant K by the collection client 202.

At instant H, the collection client 202 sends a first RTCP SR packet 602 in multicast mode that includes the value H in the field NTP202, the value C in the field LSR2101, and the value F in the field DLSR2101, where F is equal to the difference between H and D. This first RTCP SR packet 602 is received at instant J by the collection server 101 and at instant L by the collection client 201.

At instant O, the collection server 101 sends a second RTCP SR packet 501 in multicast mode, the packet including the value O in the field NTP1101, the value G in the field LSR201, and the value M in the field DLSR201, where M is equal to the difference between O and I. This second RTCP SR packet 501 is received at an instant P by the collection client 201.

At instant Q, the collection server 101 sends a second RTCP SR packet 502 in multicast mode, the packet including the value Q in the field NTP2101, the value H in the field LSR202, and the value N in the field DLSR202, where N is equal to the difference between Q and J. This second RTCP SR packet 502 is received in particular at instant R by the collection client 202.

At instant U, the collection client 201 sends a second RTCP SR packet 601 in multicast mode, the packet including the value U in the field NTP201, the value O in the field LSR1101, and the value S in the field DLSR1101, where S is equal to the difference between U and P. This second RTCP SR packet 601 is received at instant W by the collection server 101 and at instant Y by the collection client 202.

At instant V, the collection client 202 sends a second RTCP SR packet 602 in multicast mode, the packet including the value V in the field NTP202, the value Q in the field LSR2101, and the value T in the field DLSR2101, where T is equal to the difference between V and R. This second RTCP SR packet 602 is received at instant X by the collection server 101 and at instant Z by the collection client 201.

Exchanges of control data 501, 502, 601, 602 thus continue within the broadcast group.

When the collection client 201 has received the second RTCP SR packets 501 and 502 from the collection server 101 and the second RTCP SR packet 602 from the collection client 202, the collection client 201 implements a determination step E2 for determining a first transmission time between itself and the collection server 101 and a second transmission time between itself and the collection client 202. It should be understood that a second transmission time is determined for each of the collection clients in the broadcast group that have sent RTCP SR packets 602.

Concerning the first transmission time, written TA below, the collection client 201 applies the calculation method as specified in RFC 3550. More precisely, it calculates:

$$TA=(P-G-M)/2$$

where:

G is the LSR201 field of the first RTCP SR packet 501 received from the server and relating to the exchange of control data between itself and the server;

M is the DLSR201 field of this RTCP SR packet 501; and

P corresponds to the instant at which this RTCP SR packet 501 was received.

The first transmission time TA is determined on receiving an RTCP SR packet 501 from the collection server 101.

Concerning the second transmission time, written TB below, the collection client 201 determines it using the following calculation formula:

$$TB=(H+N-G-M-P-T-V)/2+Z-Q+O$$

where:
- H is the LSR202 field of the last received RTCP SR packet 502 from the server relating to the exchange of control data between the server and the collection client 202;
- N is the DLSR202 field of this last RTCP SR packet 502;
- Q is the NTP2101 field of this last RTCP SR packet 502;
- G is the LSR201 field of the last received RTCP SR packet 501 from the server relating to the exchange of control data between itself and the server;
- M is the DLSR201 field of this last RTCP SR packet 501;
- O is the NTP1101 field of this last RTCP SR packet 501;
- P corresponds to the instant at which this last RTCP SR packet 501 was received;
- T is the DLSR2101 field of the last received RTCP SR packet 602 sent by the collection client 202 and relating to the exchange of control data between itself and the server;
- V it the NTP202 field of this last RTCP SR packet 602; and
- Z corresponds to the instant at which this last RTCP SR packet 602 was received.

The second transmission time TB is determined on receiving an RTCP SR packet 602 from the collection client 202. This determination is performed for each of the collection clients of the broadcast group.

When the collection server 101 has received the second RTCP SR packet 601 from the collection client 201, the collection server 101 implements a determination step F2 for determining a transmission time between itself and the collection client 201.

Concerning this transmission time, written TC, the collection server 101 applies the calculation method as specified in RFC 3550. More precisely, it calculates:

$$TC=(W-S-O)/2$$

where:
- O is the LSR1101 field of the last received RTCP SR packet 601 from the collection client 201 and relating to the exchange of control data between itself and the server;
- S is the DLSR1101 field of this last RTCP SR packet 601; and
- W corresponds to the instant at which this last RTCP SR packet 601 was received.

It should be understood that this transmission time TC is determined for each collection client of the broadcast group on receiving an RTCP packet sent by the collection client and relating to the exchange of control data between itself and the server.

The use of these various transmission times in the collection method is described in detail below.

In a variant, smoothed transmission times are determined, e.g. by applying a finite-order discrete filter to the most recently obtained transmission time values.

Figure 3:
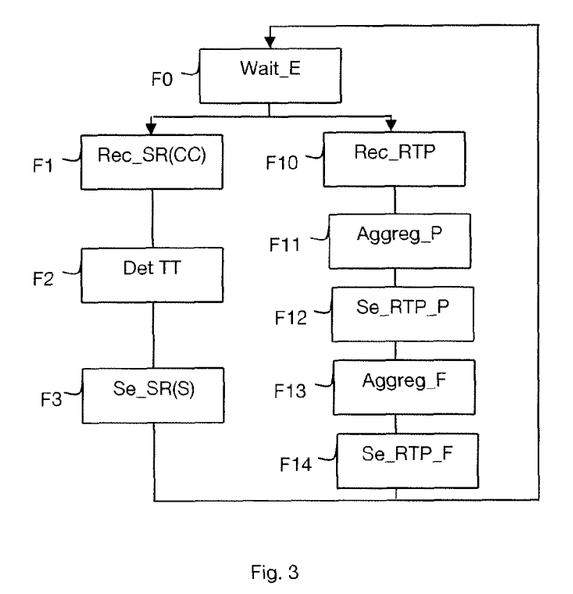
FIG. 3 shows the steps of the collection method as implemented by a server in a particular embodiment of the invention.

The method of collecting real time data as implemented by the collection client 101 is described below with reference to FIG. 3.

In a step F0, the collection server 101 is waiting for an event.

If during a step F1 it is detected that the event is receiving an RTCP SR packet from a collection client, then the collection server 101 acts during a transmission time determination step F2 of the kind described above to determine the transmission time TC between itself and the collection client that sent the RTCP SR packet.

In a step F3, the collection server 101 transmits an RTCP SR packet 501 in multicast mode, as described above.

The method returns to step F0, waiting for an event.

If during a step F10 it is detected that the event is receiving RTP packets of real time data from a collection client, then the method passes to a partial aggregation step F11. In this partial aggregation step F11, the collection server 101 determines a partial aggregate in which it uses the respective transmission times determined during step F2 for each collection client to take account of a time offset between the instant at which the real time data contained in the RTP packet was collected and the instant at which this RTP packet was received. More precisely, the real time data is aggregated as a function of respective send instants as determined from the determined transmission times. In order to determine this partial aggregate, the collection server 101 also sets aside RTP packets received from collection clients for which the respective transmission times as determined by the collection server 101 during the step F2 are greater than a first threshold.

In a variant of this partial aggregation step F11, the collection server 101 sets aside RTP packets received from collection clients for which the quality of transport is less than a second threshold. The quality of transport, in particular jitter or loss of RTP packets, may be determined in accordance with RFC3550 on the basis of parameters included in the RTP packets (quality perceived by the server), such as a sequence number, a send instant, a receive instant, or indeed from parameters included in the RTCP packets (quality received by the clients) such as a packet loss ratio, jitter, . . . .

In a variant of this partial aggregation step F11, the collection server 101 sets aside the RTP packets received from collection clients for which the loss packet ratio contained in the received RTCP SR packet is greater than a third threshold.

In yet another variant of this partial aggregation step F11, the collection server 101 sets aside RTP packets received from collection clients for which an inter-arrival jitter contained in the received RTCP SR packet is greater than a fourth threshold.

These different variants may be performed singly or in combination.

Then, in a step F12, the collection server 101 transmits the partial aggregate as determined in an RTP packet to the collection clients 201 and 202 of the broadcast group in multicast mode.

Thus, the collection clients 201 and 202 quickly receive return of information about the relevance of the information they have sent in the RTP packets.

In a step F13, the collection server 101 determines a total aggregate of the RTP packets received from collection clients, in which it uses the respective transmission times determined during step F2 for each collection client to take account of a time offset between the instant at which the real time data contained in the RTP packet was collected and the instant at which the RTP packet was received. More precisely, the real time data is aggregated as a function of respective send instants as determined from respective determined transmission times.

The aggregates may be determined in the transport layer or in the application layer. If they are determined in the application layer, then while the partial aggregate is being determined, the algorithm used for generating the partial aggregate may be simpler to implement than the algorithm used for generating a total aggregate.

Thereafter, in a step F14, the collection server 101 transmits an RTP packet containing the determined total aggregate to the consultation client 203.

A client-server type architecture thus enables a server to collect the real time information as collected by the sources, and to summarize it for consultation clients. Nevertheless, in a network having a large number of sources, information collection and information summary generation by the server may give rise to a considerable delay that is not compatible with the fact that the sources contributing to collecting information need to obtain an at least partial return concerning information summary within a very short time. Thus, the partial and total aggregates make it possible to satisfy equally the requirements both of the sources and of the consultation clients.

The method returns to step F0 waiting for an event.

Figure 4:
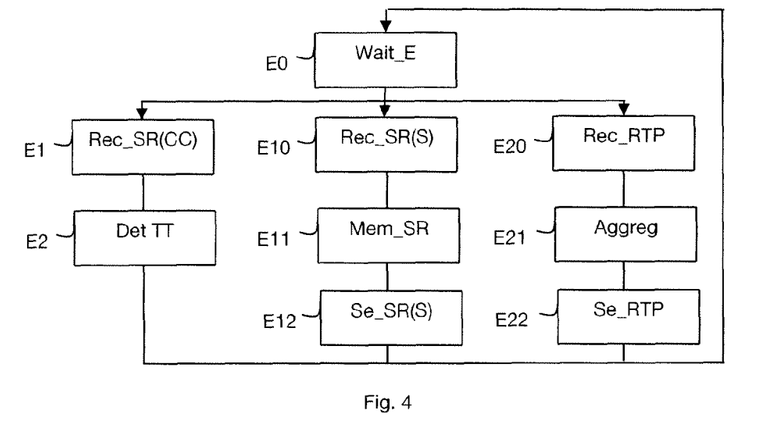
FIG. 4 shows the steps of the collection method as implemented by a collection client in a particular embodiment of the invention.

The real time data collection method as implemented by the collection client 201 is described below with reference to FIG. 4.

In a step E0, the client 201 is waiting for an event.

If during a step E1 it is detected that the event is receiving an RTCP SR packet from another collection client, then the collection client 201 acts in a transmission time determination step E2 as described above, on the basis of a first RTCP SR packet 602 received from the other collection client 202 and relating to the exchange of control data between the other collection client 202 and the server, and from RTCP SR packets received from the collection server 101 and relating to control data exchanges between the server and the collection client, to determine the first transmission time TA between itself and the collection server 101 and the second transmission time TB between itself and the other collection client, e.g. for the collection client 202. It is thus possible for the collection client 201 to determine the second transmission time between itself and the other collection client without needing to establish an exchange of control data with said other collection client. Processor and memory resources are thus economized. Adding a new collection client in the multicast broadcast group can be handled more simply given that there is no need for the collection client 201 to establish any new exchange of control data.

The method then returns to step E0 waiting for an event.

If during a step E10 it is detected that the event is receiving an RTCP SR packet from the collection server 101, then the collection client 201 acts in a step E11 to store the received RTCP SR packet for subsequent processing.

Thereafter, in a step E12, the collection client 201 transmits an RTCP SR packet 601 as described above in multicast mode to the collection client 101.

The method then returns to step E0 waiting for an event.

If during a step E20 it is detected that the event is receiving RTP packets of real time data from the collection server 101 and the collection client, then the method moves on to a separate aggregation step E21. It should be recalled that the RTP packet received from the collection server 101 includes a partial aggregate.

In this aggregation step E21, the collection client 201 determines a first aggregate from information that it has itself collected and from information contained in the RTP packets received from other collection clients, in which it uses the respective transmission times determined during the step E2 for each collection client to take account of a time offset between the instant at which the real time data contained in the RTP packet was collected and the instant at which the RTP packet was received. More precisely, the real time data is aggregated as a function of respective send instants as determined from the respective determined transmission times.

In a variant of this aggregation step E21, the collection client 201 determines a second aggregate from the information that it has itself collected, from the partial aggregate contained in the RTP packet received from the collection server 101, and from the information contained in the RTP packets received from the other collection clients, in which step it uses the respective transmission times determined during the step E2 for the collection server 101 and for each of the collection clients to take account of a time offset between the instant at which the real time information contained in the RTP packet was collected and the instant at which the RTP packet was received. More precisely, the real time data is aggregated as a function of its respective send instants as determined from the respective determined transmission times.

In a variant of this aggregation step E21, the collection client 201 sets aside RTP packets received from the collection server 101 and from the collection clients for which the respective transmission times as determined by the collection client 201 during the step E2 are greater than a first threshold.

In another variant of this aggregation step E21, the collection client 201 sets aside RTP packets received from the server and from the collection client for which a transport quality is below a second threshold. Transport quality, in particular jitter or loss of RTP packets, may be determined in compliance with RFC3550 from parameters included in the RTP packets (quality perceived by the client), such as a sequence number, a send instant, a receive instant, or indeed from parameters included in the RTCP packets (quality perceived by the server) such as a packet loss ratio, jitter, . . .

In yet another variant of this aggregation step E21, the collection client 201 sets aside RTP packets received from the collection server 101 and from collection clients for which a loss packet ratio contained in the received RTCP SR packet is greater than a third threshold.

In yet another variant of this aggregation step E21, the collection client 201 sets aside RTP packets received from the server and from the collection clients for which an inter-arrival jitter contained in the received RTCP SR packet is greater than a fourth threshold.

These different variants may be performed singly or in combination.

Thereafter, in a step E22, the collection client 201 takes the differences between the first determined aggregate and the partial aggregate received from the collection server 101, and also information contained in the RTP packets received from the other collection clients, puts them into a packet, and transmits the packet to the collection server 101 and to the other collection clients of the broadcast group in multicast mode.

In a variant of this step E22, the collection client 201 takes the differences between the first determined aggregate and the information contained in the RTP packets received from the other collection clients, puts them into an RTP packet, and transmits the packet to the collection server 101 and to the other collection clients of the broadcast group in multicast mode.

In another variant of this step E22, the collection client 201 takes the differences between the first determined aggregate, the partial aggregate received from the collection server 101, and the information contained in the RTP packet received from the other collection clients, puts them into an RTP packet, and transmits the packet to the collection server 101 and to the other collection clients of the broadcast group in multicast mode.

In yet another variant of this step E22, the collection client 201 takes the difference between the second determined aggregate and the partial aggregate received from the collection server 101, puts it into an RTP packet, and transmits the packet.

In yet another variant of this step E22, the collection client 201 takes the differences between the second determined aggregate and the information contained in the RTP packets received from other collection clients, puts them into an RTP packet, and transmits the packet to the collection server 101 and to the other collection clients of the broadcast group in multicast mode.

In yet another variant of this step E22, the collection client 201 takes the differences between the second determined aggregate, the partial aggregate received from the collection server 101, and the information contained in the RTP packets received from the other collection client, puts them into an RTP packet, and transmits the packet to the collection server 101 and to the other collection clients of the broadcast group in multicast mode.

The real time information sent in this way by the collection client 201 is firstly correlated with return of information provided by the collection server 101 by means of the partial aggregate, and secondly provides as little redundancy as possible relative to the partial aggregate. This enables the collection server 101 to aggregate mutually correlated RTP information and include a maximum of additional information.

Furthermore, the first and second aggregates may be consulted locally to the collection client 201.

The method returns to step E0 waiting for an event.

The description of an implementation is given above assuming that the collection server 101 sends control data for each collection client. The collection server 101 can equally well transmit control data for a plurality of collection clients in a single RTCP SR message 501. The implementation is then adapted. Under such circumstances, in step E2, the formula for determining the second transmission time is adapted to take account of the fact that the difference between the respective send instants for the RTCP SR control data 501 and 502 is zero, i.e. Q-O is zero. Furthermore, in step F3, the collection server 101 transmits only one control data item relating to exchanges of control data it has had with the various collection clients.

Provision may also be made for an implementation that is combined, in which the collection server 101 can transmit a first RTCP SR message for a first set of collection clients, e.g. thirty-one collection clients, and then a second RTCP SR message for a second set of collection clients.

Figure 5:
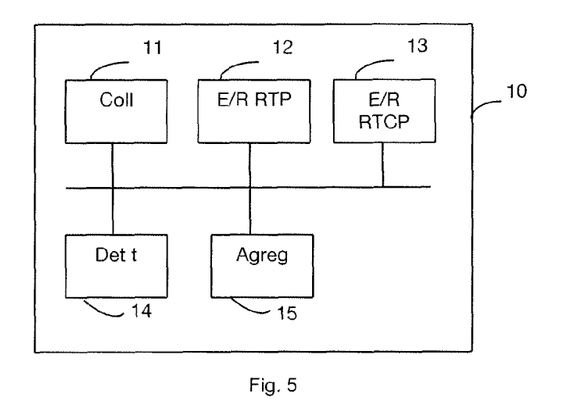
FIG. 5 shows a device for collecting real time data in a particular embodiment of the invention.

A device for real time data collection of a collection client 201 is described below with reference to FIG. 5.

Such a device 10 comprises:
a module 11 for obtaining real time information, and arranged to collect real time information;
a module 12 for sending and receiving real time data for a broadcast group in multicast mode;
a module 13 for sending and receiving control data for a broadcast group;
a module 14 for determining a transmission time between the collection client and another member of the group; and
a module 15 for aggregating real time data.

The module 13 for sending and receiving control data is also arranged:
to establish a first exchange of control data between the collection client and the server, the control data being sent in multicast mode;
to extract first time information from the received control data relating to a second exchange of control data of another collection client of the group with the server;
to extract second time information about control data received from the server and relating to the first exchange of control data between the collection client and the server; and
to extract third time information concerning control data received from the server and relating to the second exchange of control data between the other collection client and the server.

The module 14 for determining transmission time is arranged to:
act on second extracted time information to determine a first transmission time TA between the collection client and the server; and
act on first, second, and third extracted time information to determine a second transmission time TB between the collection client and the other collection client.

The aggregation module 15 is arranged:
to determine a first aggregate from information collected by the module 11, from real time data received by the module 12 from the server, and from other collection clients of the group, with the send instants of the received data being determined from respective transmission times;
to determine real time data corresponding to a difference between the information collected by the module 11, real time data received by the module 12 from the server and from other collection clients of the group, the send instants of the received data being determined from the respective transmission times; and
to transmit the determined real time data to the module 12 for sending real time data.

Figure 6:
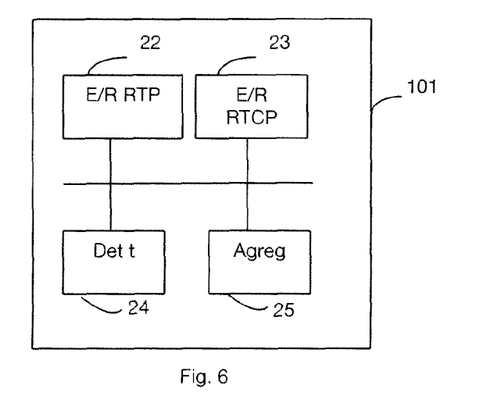
FIG. 6 shows a server for collecting real time data in a particular embodiment of the invention.

A collection server 101 for collecting real time data is described below with reference to FIG. 6.

The collection server 101 comprises:
a module 22 for sending and receiving real time data for a broadcast group in multicast mode;
a module 23 for sending and receiving control data for a broadcast group;
a module 24 for determining a transmission time TC between itself and another member of the group; and
a module 25 for aggregating real time data.

The module 23 for sending and receiving control data is also arranged:
to establish an exchange of control data with each collection client of the broadcast group, the control data being sent by the server in multicast mode; and
to extract time information from the received control data relating to an exchange of control data between itself and a collection client of the group.

The module 24 for determining transmission time is arranged:
for each collection client of the group, to determine a transmission time TC between the collection client and the server from the extracted time information.

The module 25 for aggregating real time data is arranged:
to determine a total aggregate from real time data received by the module 22 from collection clients of the group, the send instants of the received data being determined from the respective transmission times; and
to transmit the determined total aggregate to the module 22 for sending real time data.

The module 25 for aggregating real time data may also be arranged to determine a partial aggregate, from which sources having respective transmission times that are greater than a predetermined threshold are set aside, this partial aggregate being transmitted instead of and replacing the total aggregate.

The modules 12, 13, 14, and 15 of the device 10 for collecting real time data are arranged to implement the steps of the above-described collection method that are executed by the collection device. They are preferably software modules comprising software instructions for causing those steps of the above-described collection method that are implemented by the collection device to be executed. An embodiment of the invention thus also provides:

- a program for a collection device, the program including program instructions for controlling the execution of the steps of the above-described collection method that are executed by said device when said program is executed by a processor thereof; and
- a recording medium readable by a collection device and having the program for the collection device recorded thereon.

The modules 22, 23, 24, and 25 of the collection server 101 are arranged to implement the steps of the above-described collection method that are executed by the server. They are preferably software modules including software instructions for causing the steps of the above-described collection method that are implemented by a server to be executed. The method thus also provides:

- a program for a server, the program including program instructions for causing the steps of the above-described collection method that are executed by said server to be executed when said program is executed by a processor thereof; and
- a recording medium readable by a server and having the program for a server recorded thereon.

The software modules may be stored in or transmitted via a data medium. The medium may be any hardware storage medium, e.g. a compact disk read-only memory (CD-ROM), a magnetic floppy disk, or a hard disk, or indeed a transmission medium such as an electrical, optical, or radio signal, or a telecommunications network.

An embodiment of the invention also relates to a system for collecting real time data broadcast in a broadcast group, the group comprising a set of sources issuing real time data and comprising at least two sources together with a server as described above, the sources including a real time data collection device as described above.

It should be observed that RTP or RTCP packets may be transported by any type of telecommunications network, for example:

- synchronous digital hierarchy (SDH) networks or indeed synchronous optical networks (SONET) using a packet over Sonet (POS)/SDH adaptation as defined in RFC 2615;
- cell switched asynchronous networks such as asynchronous transfer mode (ATM) networks using an adaptation such as ATM adaptation layer 2 (AAL2) as defined by the International Telecommunications Union (ITU) in Recommendation 1.363.2 or ATM adaptation layer 5 (AAL5) as defined in Recommendation 1.363.5;
- Ethernet frame switched networks, e.g. constituted by Ethernet bridges as defined by the Institute of Electrical and Electronics Engineers (IEEE) in Standard 802.1, or Ethernet rings as defined in Standard 802.17, wired Ethernet links as defined in Standard 802.3, wireless Ethernet links without quality management as defined in Standard 802.11, or wireless Ethernet links with quality management and mobility as defined in Standard 802.16;
- Internet protocol packet switching networks IPv4 or IPv6 as defined by the Internet engineering task force in RFC 791 and RFC 2460; and
- packet mode mobile networks such as for example the general packet radio service (GPRS) or the universal mobile telecommunications system (UMTS), or indeed the long term evolution/system architecture evolution (LTE/SAE) system as defined in the $3^{rd}$ generation partnership project (3GPP) standards.

Although the present disclosure has been described with reference to one or more examples, workers skilled in the art will recognize that changes may be made in form and detail without departing from the scope of the disclosure and/or the appended claims.

The invention claimed is:

1. A method of communication in a broadcast group, said group comprising at least two sources and a server that send real time data and control data, a source replying to the control data sent by the server and not replying to the control data sent by another source, said at least two sources comprising a first source and a second source, said method comprising the following steps implemented by the first source of the group:

sending first control data by broadcasting to members of the broadcast group, said first control data comprising time information relating to an exchange of control data of the first source with the server, the time information including Network Time Protocol (NTP), Last Sender Report (LSR), and Delay Since Last Sender Report (DLSR) data;

receiving from the second source of the group second control data, said second control data comprising time information relating to an exchange of control data of said second source with the server;

receiving from the server third and fourth control data, said third control data comprising time information relating to the first control data, and said fourth control data comprising time information relating to the second control data; and determining a transmission time between the first and second sources on the basis of the second, third and fourth control data received, performed by the first source without receiving a reply from any of the at least two sources to the step of sending the first control data to the members of the broadcast group.

2. The method according to claim 1, wherein:

the time information comprised by first control data comprises:
a send instant of the first control data by the first source;
a send instant, by the server, of the third control data received by the first source; and
an elapsed time, at the first source, between receiving the third control data and sending the first control data;

the time information comprised by second control data comprises:
a send instant of the second control data by the second source;
a send instant, by the server, of the fourth control data received by the second source; and
an elapsed time, at the second source, between receiving the fourth control data and sending the second control data;

the time information comprised by third control data comprises:
a send instant of the third control data by the server;
a send instant, by the first source, of the first control data received by the server; and
an elapsed time, at the server, between receiving the first control data and sending the third control data; and the time information comprised by fourth control data comprises:
a send instant of the fourth control data by the server;
a send instant, by the second source, of the second control data received by the server; and an elapsed time, at the server, between receiving the second control data and sending the fourth control data.

3. The method according to claim 1, further comprising:
a step of receiving from the server an aggregate of real time data sent by the at least two sending sources;
a step of determining real time data corresponding to a difference between the real time information collected by the first source, the received aggregate, and the real time data received from the other sending sources, the send instants of the received data being determined from the respective transmission times; and
a step of sending the real time data in multicast mode.

4. The method according to claim 1, further including a step of aggregating received real time data, wherein send instants of the received data are determined from the respective transmission times.

5. The method according to claim 1, wherein:
the time information comprised by first control data comprises:
a send instant of the first control data by the first source;
a send instant, by the server, of the third control data received by the first source; and
an elapsed time, at the first source, between receiving the third control data and sending the first control data.

6. The method according to claim 1, wherein:
the time information comprised by second control data comprises:
a send instant of the second control data by the second source;
a send instant, by the server, of the fourth control data received by the second source; and
an elapsed time, at the second source, between receiving the fourth control data and sending the second control data.

7. The method according to claim 1, wherein:
the time information comprised by third control data comprises:
a send instant of the third control data by the server;
a send instant, by the first source, of the first control data received by the server; and
an elapsed time, at the server, between receiving the first control data and sending the third control data.

8. The method according to claim 1, wherein:
the time information comprised by fourth control data comprises:
a send instant of the fourth control data by the server;
a send instant, by the second source, of the second control data received by the server; and
an elapsed time, at the server, between receiving the second control data and sending the fourth control data.

9. A device for communication in a broadcast group, said group comprising at least two sources and a server that send real time data and control data, a source replying to the control data sent by the server and not replying to the control data sent by another source, said at least two sources comprising a first source and a second source, said method comprising the following steps implemented by the first source of the group:
means for sending first control data by broadcasting to members of the broadcast group, said first control data comprising time information relating to an exchange of control data of the first source with the server, the time information including Network Time Protocol (NTP), Last Sender Report (LSR), and Delay Since Last Sender Report (DLSR) data;
means for receiving from the second source of the group second control data, said second control data comprising time information relating to an exchange of control data of said second source with the server;
means for receiving from the server third and fourth control data, said third control data comprising time information relating to the first control data, and said fourth control data comprising time information relating to the second control data; and
means for determining a transmission time between the first and second sources on the basis of the second, third and fourth control data received, performed by the first source without receiving a reply from any of the at least two sources to the sending of the first control data to the members of the broadcast group.

10. A communication system comprising:
a broadcast group comprising at least two sources and a server that send real time data and control data, a source replying to the control data sent by the server and not replying to the control data sent by another source, said at least two sources comprising a first source and a second source;
wherein the first source comprises:
means for sending first control data by broadcasting to members of the broadcast group, said first control data comprising time information relating to an exchange of control data of the first source with the server, the time information including Network Time Protocol (NTP), Last Sender Report (LSR), and Delay Since Last Sender Report (DLSR) data;
means for receiving from the second source of the group second control data, said second control data comprising time information relating to an exchange of control data of said second source with the server;
means for receiving from the server third and fourth control data, said third control data comprising time information relating to the first control data, and said fourth control data comprising time information relating to the second control data; and
means for determining a transmission time between the first and second sources on the basis of the second, third and fourth control data received, performed by the first source without receiving a reply from any of the at least two sources to the sending of the first control data to the members of the broadcast group; and
wherein the server comprises:
means for receiving the first and second control data; and
means for sending the third and fourth control data by broadcasting to the members of the broadcast group.

11. The communication system according to claim 10, wherein the server further includes means for aggregating real time data sent by the sources as a function of a time offset between an instant at which real time data was collected and an instant at which said data was received at the server.

12. A non-transitory recording medium comprising a computer program recorded thereon, the program including instructions for implementing a method of collecting real time data in a device for collecting real time data when the program is executed on a processor, the real time data being broadcast in a broadcast group, said group comprising at least two sources and a server that send real time data and control data, a source replying to the control data sent by the server and not replying to the control data sent by another source, said at least two sources comprising a first source and a second source, said method comprising the following steps implemented by the first source of the group:

sending first control data by broadcasting to members of the broadcast group, said first control data comprising time information relating to an exchange of control data of the first source with the server, the time information including Network Time Protocol (NTP), Last Sender Report (LSR), and Delay Since Last Sender Report (DLSR) data;

receiving from the second source of the group second control data, said second control data comprising time information relating to an exchange of control data of said second source with the server;

receiving from the server third and fourth control data, said third control data comprising time information relating to the first control data, and said fourth control data comprising time information relating to the second control data; and determining a transmission time between the first and second sources on the basis of the second, third and fourth control data received, performed by the first source without receiving a reply from any of the at least two sources to the step of sending the first control data to the members of the broadcast group.

\* \* \* \* \*